United States Patent [19]

Roder

[11] 4,445,298
[45] May 1, 1984

[54] BASE FOR INSERTING FLOWERS, TWIGS AND SIMILAR ITEMS

[75] Inventor: Manfred Roder, Frankenthal, Fed. Rep. of Germany

[73] Assignee: Smithers Oasis GmbH & Co. KG, Fed. Rep. of Germany

[21] Appl. No.: 269,748

[22] Filed: Jun. 2, 1981

[30] Foreign Application Priority Data

Sep. 30, 1980 [DE] Fed. Rep. of Germany ... 8026097[U]

[51] Int. Cl.³ .......................... A47G 7/02; A47G 7/00
[52] U.S. Cl. .................................. 47/41.12; 47/41.13; 206/423; 428/23; 428/71; 428/76
[58] Field of Search ..................... 428/23, 76, 71, 117; 15/209 B, 209 C, 209 D, 244 R, 244 B; 47/41.12, 41.13; 206/423

[56] References Cited

U.S. PATENT DOCUMENTS

| | | | |
|---|---|---|---|
| 2,238,781 | 4/1941 | Ritter | 47/41.13 |
| 3,552,059 | 1/1971 | Moore | 47/41.12 |
| 3,829,348 | 8/1974 | Spiegel et al. | 428/11 |
| 3,867,789 | 2/1975 | Jacobson | 47/41.12 X |
| 4,058,929 | 11/1977 | O'Connell | 428/23 X |
| 4,206,570 | 6/1980 | Cooper | 428/64 X |
| 4,285,746 | 8/1981 | DePuy et al. | 428/11 X |

Primary Examiner—William J. Van Balen
Attorney, Agent, or Firm—Kinzer, Plyer, Dorn & McEachran

[57] ABSTRACT

Base for the insertion of flowers, twigs, fruits and similar items, consisting of a mass of plastic foam, which base is reliably connected (attached) to a support of plastic, rubber, wood, metal or any other suitable material, said support being a trough-shaped tube into which has been inserted a base of plastic foam, which base will fit more or less neatly into the interior of the tube, and by an act of shrinking-on has become attached a plastic foil which encases all of the base (base plus support), and said foil preferably being provided with holes all over its surface.

2 Claims, 1 Drawing Figure

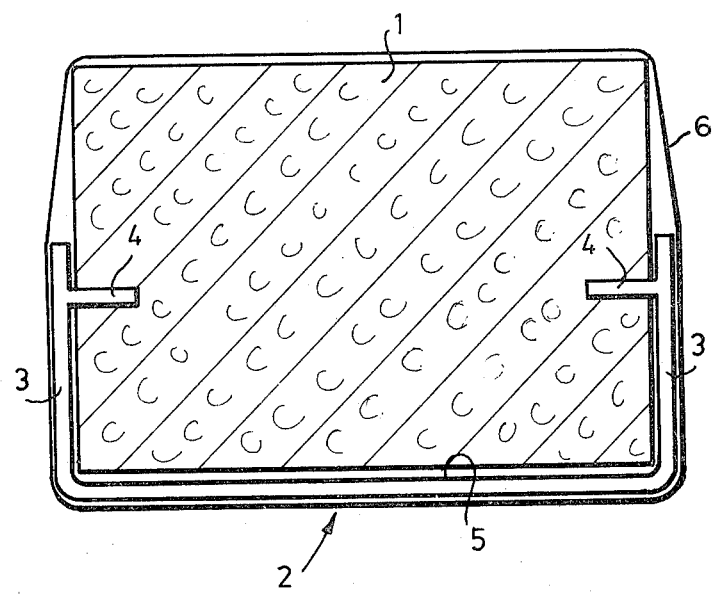

BASE FOR INSERTING FLOWERS, TWIGS AND SIMILAR ITEMS

The present invention has as subject matter a base for the insertion of flowers, twigs, fruits or similar items which base consists of a hydrophilic or hydrophobic mass from plastic foam which is tightly connected (sealed) to a support of plastic, rubber, wood, metal or still another material.

Bases for insertion, made from a number of plastic foams and in all kinds of shapes, for use with flowers, twigs, fruits, etc. are already known. In order to have these articles from a plastic foam stand up more reliably they often are glued to supports which supports are made from plastic, rubber, wood, metal or still other materials.

But one notices time and again that these foam bases, which are attached upon their supports by an act of gluing, will become separated from such support rather easily, either because they simply become broken off or also often due to this that the adhesive used just does not have the sufficient adhesive strength. This risk is especially great then when the insertion base serves for the accommodation of fresh flowers or similar items and therefore has become soaked in water. If one requires a larger base for such insertion, which is rather oblong in shape, then the risk of breaking or generally of separation from the support is indeed rather great.

It therefore was the problem to be solved according to the invention to create a base for insertion like this that the part of plastic foam is connected to its support in such a way that the connection between base and support can become separated with very great difficulties only.

This problem was indeed solved by constructing the support as trough shaped into which is placed a base of plastic foam which will fit more or less neatly thereinto; there furthermore is present a plastic foil which encloses the base and support completely and is attached to it by a shrink fit whereby said foil has distributed over its surface a number of holes. The advantage hereby is that by this foil wrapper any damage to the plastic foam due to pressure or shock is no longer possible. It is not necessary to remove such a cover when the foam shall become soaked with water, when flowers, twigs, etc. are inserted into the base, because wetting of the foam base is possible through the holes in this cover. It is rather easy to press flowers, twigs, etc., with their stems across the foil into the inside of the foam base, so that the work of decorating such an insertion base is not impeded.

If one uses a trough or support of oblong shape for accommodating a base of foam of the same shape, then the base can easily become detached from the oblong trough or support, especially then when for any reason the cover (foil) becomes removed. In order to bring about a reliable connection between the foam base and the support one may provide according to the invention at the erect, lateral legs of the trough or support inwardly directed tongues in parallel to the bottom surface, which tongues engage or mesh with grooves which become created when and as an incident to pushing the foam base into its place.

Thus, when pushing or sliding the foam base into the trough or support the two tongues which protrude into the interior will cut into the foam, so that it becomes strongly attached.

Other characteristics of the invention may be derived from the description given next of a typical example which must be considered together with the sheet of drawing and the claims.

One sees in the drawing as a cross section a trough-shaped support 2 which serves for the accommodation of a base 1 of foam upon which has been attached by a shrink-on process, so as to give an added protection, a foil 6 of a synthetic polymer, which foil 6 passes around all of the article, i.e. the trough-shaped support 2 inclusive. This now means that the free portion of the foam base is coated with a cover, however it is easy to pierce this cover with the stems of all lengths of flowers, twigs and similar items if one wishes to create a flower arrangement. As the foil furthermore is preferrably equipped, distributed across its surface, with holes it is easily possible to soak the foam base 1 with water which can penetrate the foam easily across the numerous holes. In addition the advantage is gained that the water, picked up by the foam base, cannot evaporate too rapidly, because all of the base with the exception of the holes is wrapped by the protective foil.

In order to accommodate an oblong base 1 of plastic foam it is advantageous to arrange at the two, upwardly directed lateral legs 3 of the support some tongues 4 which are directed inwardly. These tongues, which should be placed in parallel to the bottom face 5, will extend across the full length of the trough-shaped support so that then when one slides a base 1 of plastic foam (which would more or less fit into the interior of the support 2) along the bottom 5 of the support, the tongues during this act of sliding will become introduced into the base 1 of plastic foam, forming grooves in it. In this manner then the base 1 of plastic foam will become rigidly anchored inside the trough-shaped tube.

I claim:

1. A base for the insertion of flowers, twigs, fruits and similar items, consisting of a mass of a plastic foam which is rigidly connected to a support of suitable material characterized in that the support is of trough-shape, into which is placed the plastic foam, a plastic foil surrounds all of the support and plastic foam, and is attached thereto by a shrink fit and said foil being provided with holes which are distributed generally over its surface, allowing wetting of the foam while impeding evaporation therefrom.

2. Base as claimed in claim 1 further characterized in that the support includes vertically extending legs provided with inwardly directed tongues substantially in parallel to the bottom surface and embedded by insertion into grooves in the plastic foam which become formed when the foam plastic is thus introduced by a sliding motion into the tube.

* * * * *